United States Patent
Cantwell (10) Patent No.: US 6,666,255 B2
(45) Date of Patent: Dec. 23, 2003

(54) BAR CODE STENCIL AND METHOD OF USE

(76) Inventor: Jay S. Cantwell, 3905 Avery Place Ct., Bridgeton, MO (US) 63044

( * ) Notice: Subject to any disclaimer, the term of this patent is extended or adjusted under 35 U.S.C. 154(b) by 0 days.

(21) Appl. No.: 10/260,349

(22) Filed: Oct. 1, 2002

(65) Prior Publication Data

US 2003/0024679 A1 Feb. 6, 2003

Related U.S. Application Data

(60) Continuation of application No. 09/986,659, filed on Nov. 9, 2001, now abandoned, which is a continuation of application No. 09/839,159, filed on Apr. 23, 2001, now abandoned, which is a division of application No. 09/187,017, filed on Nov. 6, 1998, now Pat. No. 6,220,333.

(51) Int. Cl.[7] .......................... B22D 19/00; B22C 13/00
(52) U.S. Cl. ....................... 164/98; 164/4.1; 164/150.1; 164/229; 264/132
(58) Field of Search ....................... 164/98, 4.1, 150.1, 164/229; 249/103; 264/132; 235/456

(56) References Cited

U.S. PATENT DOCUMENTS

| | | | |
|---|---|---|---|
| 4,047,000 A | 9/1977 | Bryant et al. | 700/225 |
| 4,061,174 A * | 12/1977 | Edwards | 249/103 |
| 4,162,340 A * | 7/1979 | Fuchs | 428/83 |
| 4,175,236 A | 11/1979 | Juvinall | 250/566 |
| 4,536,421 A | 8/1985 | Matsuzawa et al. | 427/282 |
| 4,625,101 A | 11/1986 | Hinks et al. | 235/462.01 |
| 4,900,637 A * | 2/1990 | Darovec | 164/111 |
| 4,941,522 A | 7/1990 | Sakurai | 152/523 |
| 5,160,383 A | 11/1992 | Gartland et al. | 152/510 |
| 5,329,985 A | 7/1994 | Weimann | 164/4.1 |
| 5,786,028 A | 7/1998 | Cantwell | 427/282 |
| 6,222,452 B1 * | 4/2001 | Ahlstrom et al. | 340/572.1 |

FOREIGN PATENT DOCUMENTS

| | | | | |
|---|---|---|---|---|
| CH | 683073 | * | 1/1994 | 164/4.1 |
| JP | 4-75761 | | 3/1992 | 164/4.1 |
| JP | 4-75762 | | 3/1992 | 164/4.1 |

* cited by examiner

*Primary Examiner*—Tom Dunn
*Assistant Examiner*—I. H. Lin
(74) *Attorney, Agent, or Firm*—Banner & Witcoff, Ltd.

(57) ABSTRACT

A bar code identification stencil for uniquely identifying a plurality of articles. The stencil includes a carrier strip, which carries an identification code or symbology. The identification code or symbology is formed of a plurality of spaced apart data cells, or data cells, which are used to form a machine readable bar code. The stencil will be made of materials compatible to the manufacturing processes, which make the articles to be marked, and compatible to the materials out of which the articles to be marked are made. The stencil is scalable in size and shape, as are the data cells, or data cells, scalable in size and shape—all as required by the specifications of the data symbology to be directly marked on the part, or article. The bar code is unique for each of the plurality of articles to be identified.

52 Claims, 8 Drawing Sheets

BAR CODE STENCIL AND METHOD OF USE

REFERENCE TO RELATED APPLICATION

This application is a continuation of application Ser. No. 09/986,659, filed Nov. 9, 2001 now abandoned, which is a continuation of application Ser. No. 09/839,159, filed Apr. 23, 2001 and now abandoned, which is a divisional of application Ser. No. 09/187,017, filed Nov. 6, 1998, which is now U.S. Pat. No. 6,220,333, issued on Apr. 24, 2001, the entire contents of which are incorporated herein by reference.

BACKGROUND OF THE INVENTION

The present invention relates to the field of identification bar codes, readers, and scanners, and more particularly, is directed to a bar code stencil and method of using such a stencil to integrally embed, bond, attach, mold, or adhere a bar code into or onto an article during its manufacture, remanufacture, rebuilding, or revitalization. The stencil may also be used in a postproduction or aftermarket refit identification procedure for bar code marking of articles.

The development of modern bar codes began in the 1940s in response to the food industry's need for a reliable and economical system for inventory control and for automatically reading product information at grocery store checkouts. The first patent to issue on such a system is believed to be U.S. Pat. No. 2,612,994 entitled Classifying Apparatus and Method and which issued on Oct. 7, 1952.

Although the coding system used in the '994 patent relied on a series of concentric circles to encode the identification information, the original coding approach developed by the inventors was a series of narrow and wide vertical lines much like present day bar code systems. Early implementations of the concentric circle approach proved unreliable however, as the circles were difficult to print without smearing. Smeared circles introduced reading errors when scanned and thus were unacceptable. The use of vertical bars eliminated the smearing problem and associated scanning errors.

Since the adoption of the Universal Product Code (UPC) in 1973, bar codes have proliferated to virtually all areas of article and product identification. Bar codes are now widely recognized as an economical and reliable identification system.

Figure 1:
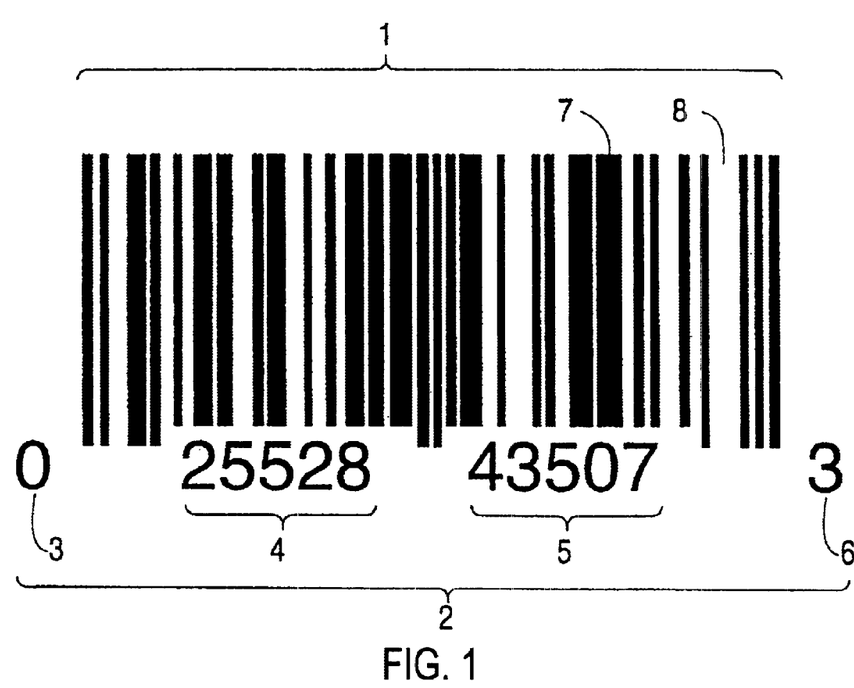
FIGS. 1 and 2 are illustrations of a UPC bar code.

Over the years, a number of different versions of the UPC bar code have been developed. Version A is one of the most popular and is illustrated in FIG. 1. The Version A format includes a plurality of spaced vertical bars 1 which form the bar code and a plurality of human readable digits which correspond to the bar code, i.e., "0 25528 43507 3" as indicted by reference number 2.

As shown in FIG. 1, the code is divided into 12 digits, with the first digit 3 being usually a "0". The next five digits 4 are assigned to the product manufacturer by the Uniform Code Council and thus serve to identify the manufacturer. Accordingly, all of the bar codes for the same manufacturer will have these same five digits. The next five digits 5 represent the item identification code given to a particular product by the manufacture. Thus, 99,999 products can be uniquely identified. The final twelfth digit 6 is a check digit which is used by the bar code scanner to confirm the accuracy of the scan.

Each of the human readable digits is encoded into the code using a two-part binary coding system as indicated in the table below:

| Code Key | | |
|---|---|---|
| Digit Value | Left Binary Code | Right Binary Code |
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

Each A1" in the key code is represented by a black bar 7 as illustrated in FIG. 1 and each A0" in the key code is represented by a white line or space 8. There is a center code of four lines (binary digits 01010) which bisect the bar code. On the left side of the bar code, the Left Binary Code digits from the above table are used and on the right side of the bar code, the Right Binary Code digits from the table are used. This mirror image coding technique allows the scanner to read the number code in either direction. Start and stop codes are used by the scanner to set the width of the binary digits within the bar code symbol. The scanner also uses the check digit to calculate a check sum as is know in the art. If the correct check sum is not calculated, the bar code read is rejected.

Figure 2:
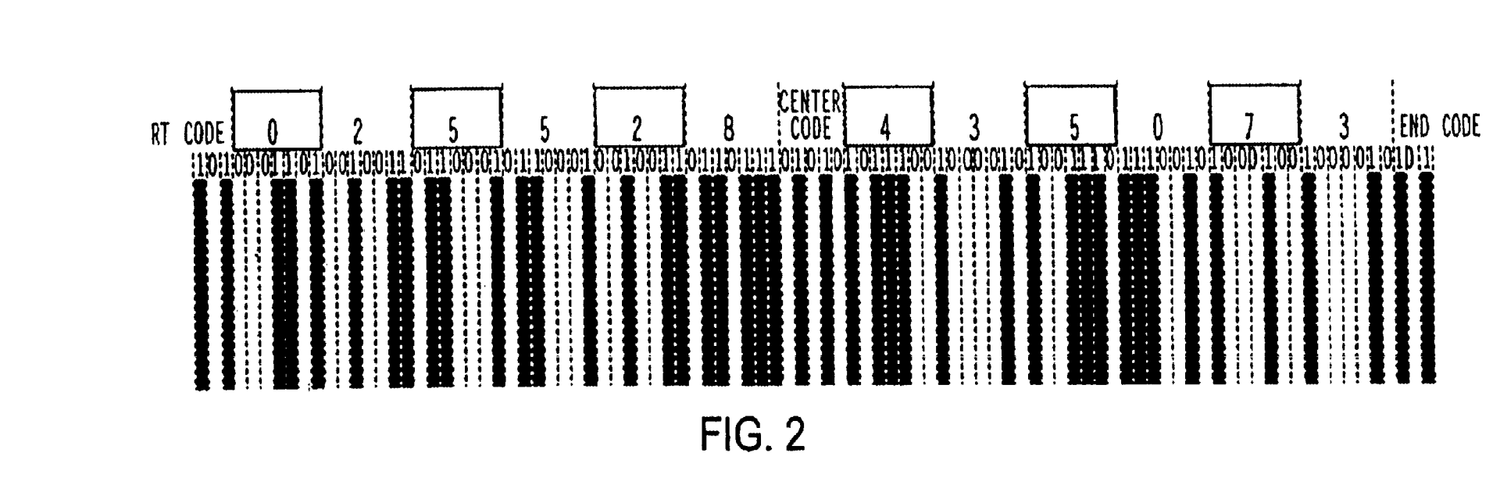

FIG. 2 is a further illustration of a typical UPC bar code with its constituent parts labeled.

As a testament to the popularity of bar code use, the UPC bar code is scheduled to be phased out by the year 2005 because its 12-digit length will no longer be sufficient to handle the demand for bar codes. In its place, the United States is expected to adopt a version of the European Article Numbering (EAN) system. The EAN bar code system has thirteen digits and can thus accommodate substantially more product identifications than the UPC.

The traditional printed bar code system continues to serve its original purpose of grocery store inventory control and check out very well. Bar codes formed of conventional two-dimensional printed bars work well where the article to be labeled is not subject to a harsh environment and the bar code label is not likely to be rubbed off or smeared over so that it cannot be read.

The food industry serves as an ideal environment for conventional bar codes. Bar codes used for food labeling are unlikely to be subjected to harsh environments due to the inherent need to prevent adulteration and damage to the food package. Thus, the bar code label is not likely to become damaged or unreadable.

The bar code system has in some respects however, become the victim of its own success. Today, attempts are being made to use bar codes in many environments in which a conventional printed two-dimensional bar code, such as the one used for food products, cannot be used. One such environment is the tire manufacturing industry.

U.S. Pat. No. 5,160,383 assigned to Goodyear Tire & Rubber discloses one example of the use of a bar code labeling technique in the tire industry. According to the patent, it is important that a tire label be highly durable so that it may still be read after many years of tire service and multiple retreadings. The patent also notes that serial numbers can be molded into tire sidewalls but that doing so is labor intensive and costly. Thus, Goodyear sought to improve upon conventional tire labeling systems by attaching an identification label to the rubber inter lining of an uncured tire. The label is made of two materials which are co-curable with the rubber of the tire. The tire is then cured using a conventional curing process which results in the label becoming permanently affixed to the inside of the tire.

Goodyear also is the assignee of U.S. Pat. No. 4,625,101 which discloses a method of molding a bar code configuration onto the sidewall of a tire. The bar code configuration has a plurality of sloped reflective surfaces which allow more flexibility in locating the bar code scanner without adversely effecting the accuracy of the scan. A bar code plate mold insert is used to mold the bar code configuration into the sidewall of the tire during the vulcanization process.

Another technique for labeling a tire is disclosed in U.S. Pat. No. 4,941,522 assigned to the Yokohama Rubber Company. The Yokohama approach involves an improved bar code plate mold insert which is also used to mold a bar code into a side wall of the tire during the vulcanization process. The improved plate is said to solve the problem of deterioration of the tire's resistance to weather in the area of the molded bar code.

The instant invention differs from the above-cited patents in many respects, the chief of which being both the uniqueness of each stencil and the disposability of the stencil. That is, the instant invention requires that each stencil be made with a code unique to the part being marked. Because harsh environment marks are typically placed on durable goods, i.e., car parts, aerospace parts, heavy equipment parts, oil pipes, etc., the market and regulatory need is for traceability throughout the useful life of the part and the piece of equipment, machine, or item of which the marked part is assembled into. In essence, the marks made possible by the instant invention will allow databases to be developed which follow the marked part from the date of marking to the end of the useful life. It is contemplated that the marks made possible by the instant invention will play an important role in facilitating databases of safety critical parts in many, many industries, including aerospace, automotive, energy, and the like.

Like the tire manufacturing industry, bar code labels also have great utility in other harsh environments as well. For example, domestic metal casters cast and ship millions of tons of product each year. An effective way to identify each product for tracking and inventory control purposes is to label it with a bar code. Because casts usually are subjected to a post casting process to finish and shape them to their final form, a conventional printed bar code label is often difficult to apply to a casting surface and is also subject to being rubbed off or covered over during the subsequent finishing process. Moreover, a printed bar code label is likely to deteriorate over time, well before the end of the life of the cast itself, making the bar code difficult or impossible to read.

Ideally, an identification bar code will be embedded into the article during the manufacturing process. Doing so, avoids the possibility of misidentification, i.e., the wrong bar code being applied, in a subsequent labeling step.

Figure 3:
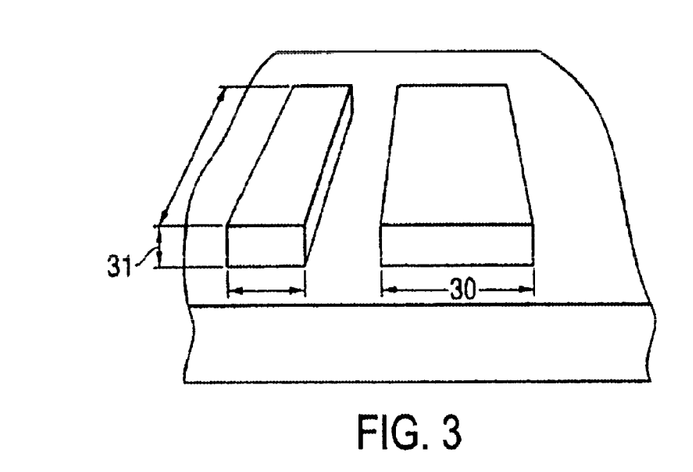
FIG. 3 is an illustration of a three dimensional bar code.

In order to improve the durability and readability of bar codes in harsh environments such as casting, a three-dimensional bar code construction was developed. An end view of a portion of such a bar code is illustrated in FIG. 3. Each bar has a width 30 and a height 31. The distinguishing feature of this type of bar code is its height 31. The bar code is scanned by a three-dimensional bar code reader which detects the presence or absence of a bar based on its height rather than its contrast as a conventional two dimensional bar code reader does. Thus, a three dimensional bar code can be read when no color contrast is available. Contrast, for reading purposes, is supplied by the profile of the data cell relative to the surrounding surface, and the direction of the lighting of the reading device. Light beams are sometimes recaptured, or directed in such a way to cast 'shadows,' or are directed to reflect away from the reading device. Three dimensional bar code readers are known in the art, and include the readers formerly manufactured by the Sensis Corporation (laser illuminated), and more readily available optical readers manufactured by such companies as Cognex Corporation, DVT, Inc., Robotic Vision Systems, Inc., and others. Most of the reading systems now capable of deciphering three dimensional, or Bumpy, bar codes evolved out of vision inspection systems, and have made their appearance in the marketplace relatively recently.

Three dimensional bar codes have proved to be a much better choice in some situations as they will not easily rub off, smear, peel, or vanish because bonding strengths, in essence, equate to a direct part marking system, or in case of molding processes, are, in fact, simply contours in the part itself.

Three-dimensional bar codes can be painted over or the article on which they are placed can be subjected to various treatment processes without the readability of the bar code being adversely affected. Three-dimensional bar codes are also useful where a traditional printed bar code label will not adhere to the surface of the article to be labeled.

The use of bar codes during manufacture for work-in-process tracking, inventory control, work piece routing, etc., has become a valuable tool. Embedding, or molding, the bar code into the article during its manufacture is the most expedient and cost effective identification system. However, due to the harsh environments in which many manufacturing processes occur embedding or molding a bar code into a manufactured article can present many challenges. These challenges involve overcoming the ill effects caused by the very high temperatures, abrasive and corrosive treatments and processes, and pressures that are present in, e.g., cast and molding processes, forging, machining, and other manufacturing or remanufacturing processes. In addition to OEM manufacturing there are millions and millions of parts, often safety critical, that are currently in use which need traceability, and in some instances, require traceability by reason of governmental regulation. Thus, there is a need in the art for a bar code stencil which can be easily and reliably used for embedding, molding, or otherwise adhering bar codes by means of a direct part marking process into or onto articles during their manufacture, remanufacture, maintenance, or normal use.

SUMMARY OF THE INVENTION

Accordingly, it is an objective of the present invention to obviate the above-noted shortcomings and disadvantages of present methods of marking an article with a bar code.

It is a further objective of the present invention to provide an improved method of bar code marking which is more reliable and cost effective than conventional methods.

It is a still further objective of the present invention to provide an improved method of bar code marking which is economical to implement and simple in operation.

It is a still further objective of the present invention to provide an improved method of bar code marking which can be used in harsh environments.

It is another objective of the present invention to provide an improved method of bar code marking which can be used to embed a bar code into a metal cast article during the casting process.

It is a further objective of the present invention to provide an improved method of bar code marking which can be used to embed a bar code into a molded article, of whatever material made, during the molding process.

It is a another objective of the present invention to provide an improved method of bar code marking which can be used to bar code an article in the field, or during a maintenance, rebuilding, or revitalization process by means of chemical or mechanical bonding including, but not limited to epoxies, electrode or chemical etch processes, and thermal sprays.

It is still another objective of the present invention to provide a bar code stencil which allows all of the above noted objectives to achieved.

The bar code stencil of the present invention, allows the embedding of a permanently formed bar code into a cast metal or molded part at the point of manufacture. The stencils can have sequentially numbered bar codes that are placed directly into a mold cavity. Once in the cavity, the mold is closed and filled as normal with the desired material. The result is a bar code that is literally molded or cast onto or into the surface of the finished article out of the same material as the article.

In thermal spray application of bar codes, the bar code stencil of the present invention allows the embedding and/or bonding of a permanently formed bar code onto and/or into a part by means of extremely high temperatures and mechanical bonding of selected materials into the part being marked. Thermal spray processes are well established and used in many industries. Thermal spray processes were invented nearly a hundred years ago, and have been extensively used in industry for nearly seventy years. Just as the bar code stencil of the present invention allows a normal casting or molding process to become a highly durable and dependable direct part marking process, so the bar code stencil of the present invention allows this immensely durable coating technology to be used as an immensely durable direct part marking process for the application of bar code symbologies. In thermal spraying, metal wires, metal powders, ceramics, or other materials are melted at a combustion point and then sprayed onto a prepared surface by means of compressed air. While the combustion point will be thousands of degrees, the surface of the part being sprayed will rarely exceed 350 degrees during the spraying process, well below temperatures that would adversely affect the structural integrity of the material out of which the part is made. As the hot, molten spray hits the part surface the disparity of the temperatures and the force of the spray causes a mechanical bond, which will be many thousands of pounds per square inch. Using this system with the present invention creates a highly durable and dependable bar code. Electrode coating and chemical etch processes can be similarly adapted to become marking systems through the use of the stencil of the present invention.

The bars which form the bar code take on a raised, three-dimensional form that has all the strength and visual characteristics of the parent article material and can be read through grease and grim unlike the bars on a printed label.

Several variations of the stencil can be provided for different article manufacturing, remanufacturing, or maintenance processes. Variations in the stencils are primarily based on the temperature and pressures that a particular process requires when generating an article. For example, casting a bar code into the side of an iron engine block requires a stencil capable of withstanding in excess of 3,000 degrees F. with very little pressure. A stencil for use in molding a bar code integral to an injection-molded article, however, requires a material capable of 5,000 degrees F and 3,500 PSI.

The stencil of the present invention can be sequentially, or uniquely, encoded with any number of digits in any x-dimension and with most of the bar code symbologies in use today, including the so-called 2D codes such as data matrix.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

A preferred embodiment of the present invention will now be described with further reference to accompanying drawings.

Figures 4, 5:
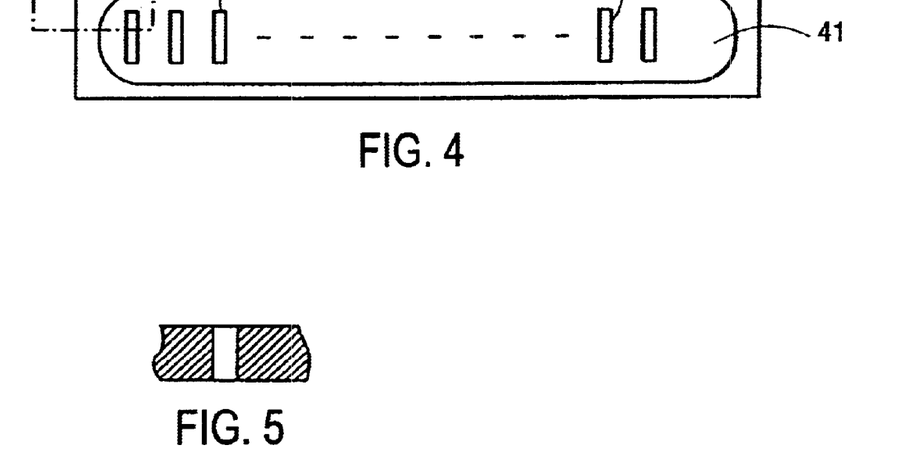
FIG. 4 is an illustration of a bar code stencil in accordance with the present invention.
FIGS. 5–13 are various bar code cross sections.

FIG. 4 illustrates one embodiment of a bar code stencil according to the present invention. The stencil includes a carrier strip 40 with an area 41 in which pluralities of bar code marker locations 42 are provided along carrier strip 40. Bar code marker locations 42 may also be referred to as "data cell" locations. When the bar code is formed on the work piece, the data cell locations form data cells or bar code makers which convey the bar information. The stencil may be used with virtually any bar code symbology without departing from the spirit and objectives of the invention.

Carrier strip 40 will generally be a square or rectangular shape, depending on the symbology used and the shape and size of the part to be marked, and its size will likewise depend on the symbology used and the shape and size of the part to be marked as well as the manufacturing processes to which the part will be subjected after marking. Sizes may range from as much as a 12 square inch area to stencils that are only fractions of an inch in total area.

Carrier strip 40 may be made from a number of materials known in the prior art, including materials which have fiber reinforcement with a binding agent to contain the fiber reinforcement. Other materials will include, but not be limited to, vinyls, polyesters, plastics, waxes, and the like. In essence, the stencil of the subject invention will often be made of materials used or compatible with the manufacturing processes and materials used in the making of the part to be marked. Likewise, given that the stencil is inserted in a casting or molding process, the stencil may serve other purposes, such as the formation of a void or part feature, in addition to the forming of a bar code symbology. For example, in a casting process the data symbology may be punched, routed, or drilled into a core insert material, and the core insert material will then be placed into the cast mold. While the core insert's purpose is to form a feature of the casting, it may also serve to form and place the bar code. The stencil of the subject invention will be, in fact, handled and inserted into a mold just as other core inserts have been inserted into molds to form features of the part for as long as casting and molding processes have existed. The uniqueness of the present invention lies in the sequential, or unique, codes punched, routed and drilled, the one-time use of a particular stencil, the scalability of the stencil, and the immense reliability of the bar codes marked with the present invention. The stencil of the present invention allows established manufacturing processes to be used a direct part marking methodologies.

The type of material used to make carrier strip 40 will also depend on the structural integrity requirements of the stencil during manufacture of the article for which the stencil will be used to identify. For example, during casting with molten metals, temperatures can reach 3,500 degree F. For use in such an environment, carrier 40 may be made from a ceramic fiber material in order to provide the required resistance to high temperature. In some applications, carrier strip 40 may also be subjected to pressures as high as 5,000 PSI, either positive or negative. Thus, the material used to make carrier 40 must be selected accordingly.

In an environment where the stencil will not be subjected to temperature extremes, for example, in an after market marking process, carrier 40 may be made with lower temperature grade materials.

Figure 6:
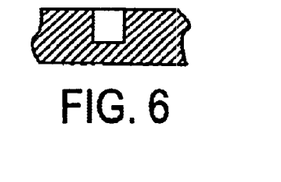

At selected marker locations 42, a void is formed in carrier 40 in accordance with the particular bar code symbology to be used. In essence, the voids allow the formation of data cells at the appropriate point in accordance with the code symbology being used. These voids can comprise cutouts which are formed fully through carrier 40 or can be mere depressions created by a press or stamp. FIG. 5 is a cross section of one void formed by a cutout and FIG. 6 is a cross section of a void formed by a depression. Cutouts may be formed in carrier 40 using water jet cutting technology, laser punching or cutting technology, or more commonly by blade cutting, punching, or routing processes.

Figure 7:
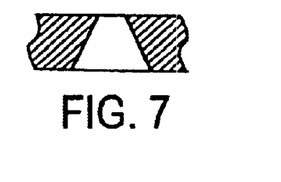
Figure 8:
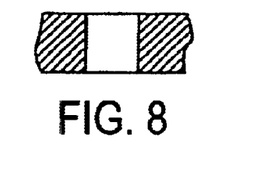
Figure 9:
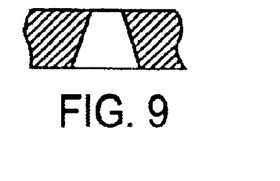
Figure 10:
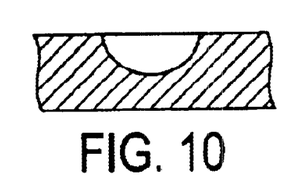
Figure 11:
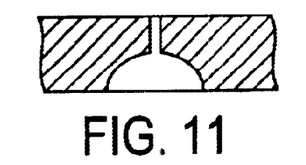
Figure 12:
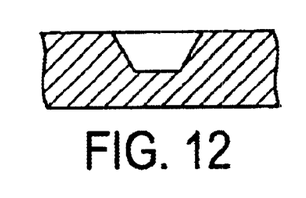
Figure 13:
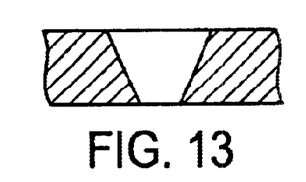

Applicant has discovered that the particular profile of the void has a great deal of impact on the durability of the three dimensional bar code formed when the stencil is used in a casting or molding operation. Applicant has learned that a three dimensional bar having a cross section as illustrated in FIG. 7 has greater strength and durability than one having a rectangular cross section as shown in FIG. 8. Thus, voids 42 are ideally formed in carrier 40 with a cross section as illustrated in FIG. 9. FIGS. 10–13 illustrate other cross-sections which voids 42 may have in accordance with the present invention.

Figure 14:
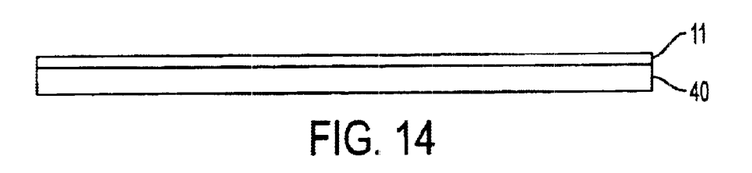
FIG. 14 is a side view of a bar code stencil in accordance with the present invention illustrating the use of a double back adhesive tape.

When used in a cast or mold, the stencil may be attached to a surface of the cast or mold using a number of attachment means, including fastening clips, ties, nails or brads, adhesives, and epoxy. Carrier 40 may also be formed of a material which has been magnetized so that the carrier will naturally stick to the surface of, e.g., a mold. Carrier 40 may also be provided with a double back adhesive 11 for attachment purposes as shown in FIG. 14.

Figure 15:
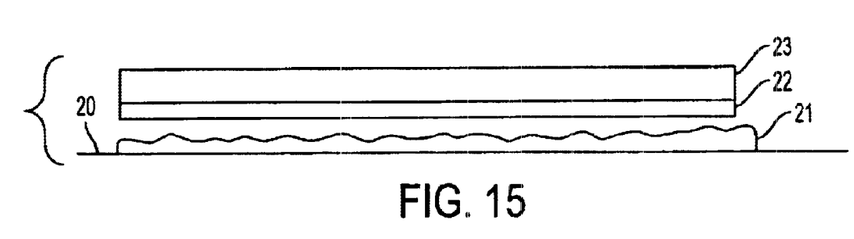
FIG. 15 is a side view of a bar code stencil in accordance with the present invention illustrating the use of an over laminate.

In the case where the stencil is attached using epoxy, the stencil may be provided with an over laminate on the opposed side in order to prevent the epoxy from entering the cut outs which form the bar code bars. Or the data cell may be punched, routed, or drilled only partially into the stencil material. FIG. 15 illustrates this application where reference number 20 refers to an interior surface of, for example, a mold, to which an epoxy material 21 is applied to hold stencil 23. An over laminate 22 prevents the epoxy material from entering the cut out.

Figure 16:
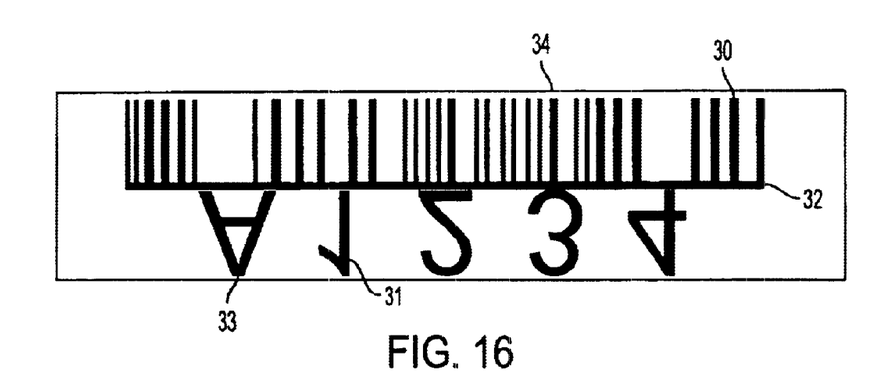
FIG. 16 is a top view of a bar code stencil in accordance with the present invention which is adapted for use in a plastic mold.

FIG. 16 illustrates a bar code stencil which has been formed by depressions 30 at selected marker locations. The stencil also includes human readable digits 31 which correspond to the bar code. Note that one end of each bar and digit character meet at a common runner 32 and that the opposite edges correspond with the edges of the stencil. Such a construction allows the stencil to be easily used in a plastic mode with out flashing or incomplete formation of the bar code or human readable digits.

Most often the stencil material will destruct during use, but in certain instances the application process may not destroy the stencil material. In those instances, an overlay, coating, or laminate may be applied to the stencil to provide proof of singular use. That is, in order to provide proof that the unique bar code was used only once, the non-destructible stencil will have a destructible overlay, coating, or laminate that will show evidence of tampering, removal, or disturbance. Such an addition to the stencil would allow audit of non-destructible stencils so as to ensure the singular application of a unique bar code to an individual part.

The bar code stencil and method of the present invention, lend itself to a number of applications in many different environments. These applications and environments are summarized below but are not considered to be limiting.

Non-Intrusive Point-of-Cast Stencil Insert for Casting Metal Parts from Sand Molds Cast metal marking of selected data symbologies can be achieved by punching a pattern of the selected symbol out of certain specific formula millboards, or other materials used for core inserts, or core inserts themselves into which bar codes may be punched, routed, or drilled. The punched stencils are then placed into and secured in the sand mold. After the metal is poured, the molded part is cooled, and the molds are 'shook-out', the data symbology presents itself in three-dimensional form as part of the casting.

Figure 17:
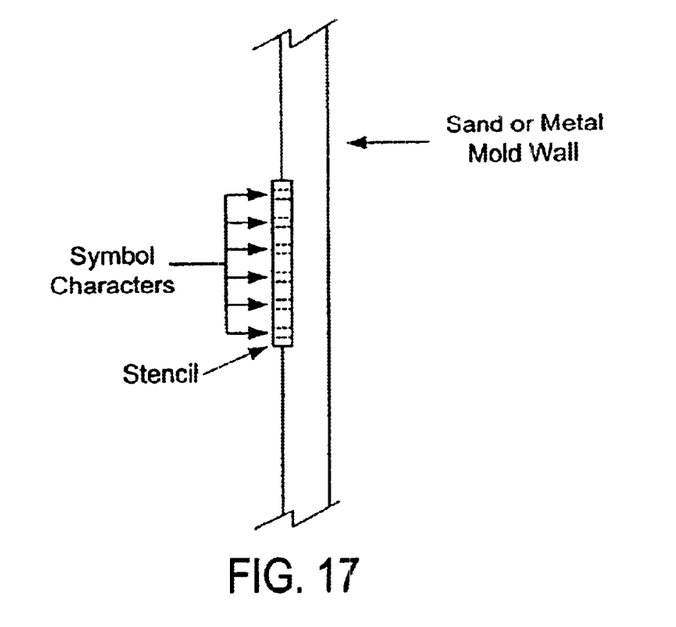
FIG. 17 is a side view of a bar code stencil in accordance with the present invention illustrating its use in a recessed cavity of a sand or metal mold.
Figure 18:
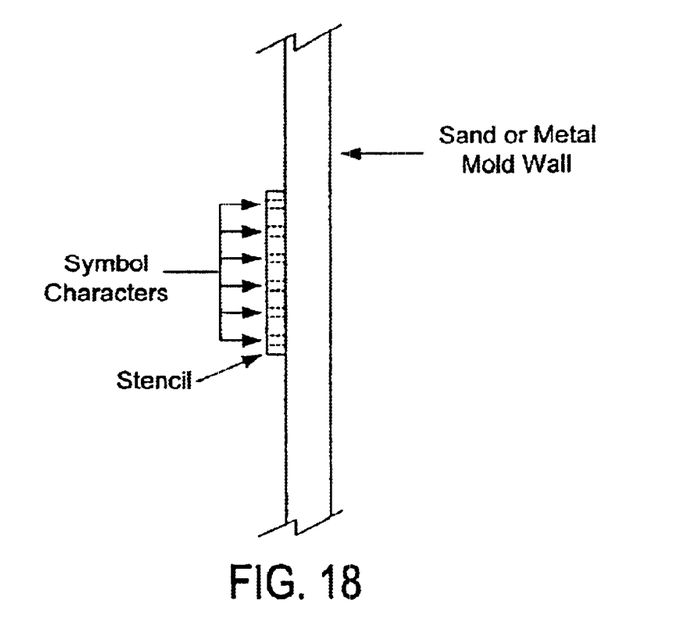
FIG. 18 is a side view of a bar code stencil in accordance with the present invention illustrating its use on the surface of a sand or metal mold.

The stencil insert may be either placed in a recessed cavity in the sand mold, or not. FIGS. 17 and 18 illustrate this approach. Methodologies for securing the stencil insert to avoid backcasting, and to minimize outgassing will vary depending on the type of metal, and range from glues and cements to nailing the stencil insert to the sand mold.

The minimum size of the stencil insert is primarily limited by the properties of the metals to be cast and the machining or manufacturing processes to which the casting is subject. However, once the properties of the metals are known, the stencil insert process can be adjusted to achieve the preferred profiles for reading the selected data symbology.

Figure 19:
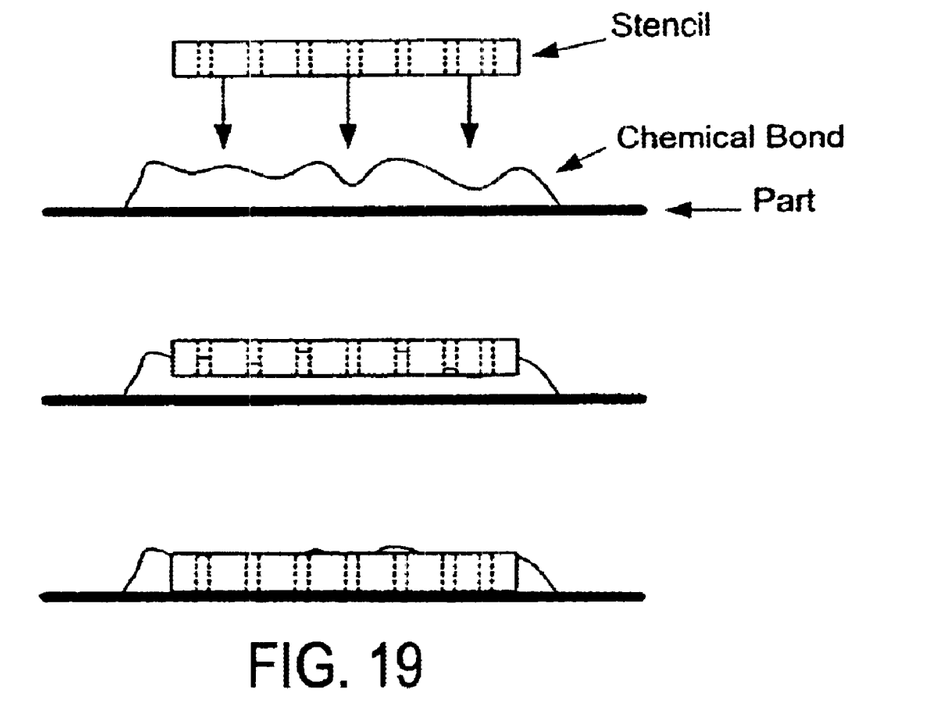
FIG. 19 is a side view of a bar code stencil in accordance with the present invention illustrating its use with a chemical bond.

Non-Intrusive Molding of Symbologies Through Use of Stencil Mold Placed into a Chemical Bond In this marking methodology a stencil is cut or punched from a material selected for its non-bonding properties relative to the chemical used as the mold medium. The mold medium is selected for its bonding and longevity properties relative to the material demanding the traceable data symbology. The process itself requires the mold medium chemical to be applied to the part and before the mold chemical 'sets-up' the stencil is placed into the malleable chemical. FIG. 19 illustrates this approach. After bonding and hardening the non-stick stencil is removed, leaving a three-dimensional data symbology on the part. Alternatively, the stencil may be made of a non-release material. That is, the stencil material may be used for other purposes such as coating or contrast (for bar code readers). If the stencil is to be removed the date cell wall sides may be sloped to achieve a data cell base larger at the bottom in relationship to the top so as to promote easy removal. Conversely, if the stencil is to remain in the mold medium, the slope of the data cell bars may be reversed to aid in the locking of the stencil in place.

The mold-a-code process is extremely flexible and only limited by the conditions to which the selected part is subjected or out of which the part is made. Likewise, the mold-a-code process may be used in a molding process, i.e., molded or die cast plastics or chemical compounds, or in the direct part marking process where the stencil is used to form a bar code in epoxies or other chemicals which bond with or become part of the part marked. The mold-a-code process may also be used with dissolvable stencil materials such as plastics or waxes so that after the material used to form the data cells of the bar code 'sets' or hardens, the stencil itself may be disposed of by melting or dissolving.

Figure 20:
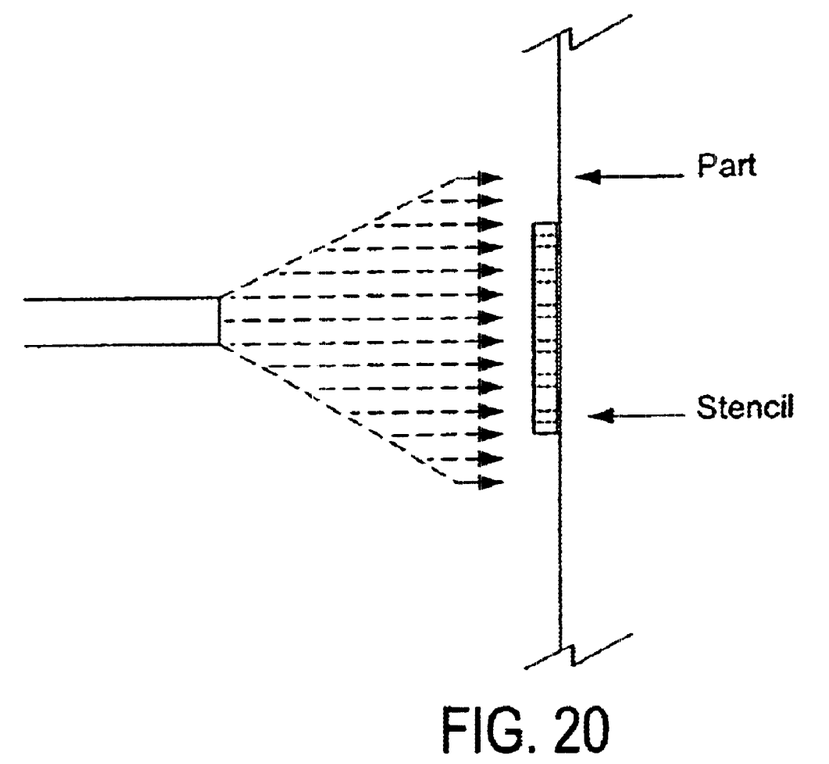
FIG. 20 is a side view of a bar code stencil in accordance with the present invention illustrating its use with a spray material.

Non-Intrusive Application of Symbologies By The Spraying of Heated Metals Through a Cut or Punched Stencil In this marking methodology a stencil is cut or punched from a material selected for its properties relative to the application of a thermal spray and the part to be marked. The process requires the stencil to be secured against the part to be marked and for the thermal spray to applied over the entire stencil. After application of the thermal spray the stencil may or may not be removed, depending on the characteristics of the stencil material, leaving a three-dimensional data symbology on the part. FIG. 20 illustrates this approach. The thermal spray process is extremely versatile and adaptable, and may be used in manufacturing processes as well as maintenance processes, rebuilding, and revitalization of parts. Again, the stencil and the data cells are scalable in size and are limited only by the properties of the thermal spray process and the readers of the bar codes applied. Most importantly, while the thermal spray's ignition or combustion point is high temperature, it can be applied to something as fragile as a business card without damage to the card.

Non-Intrusive Application of Symbologies by The Spraying of Paints, Rubbers, or Other Chemicals Selected for Bonding Properties to the Surface To be Marked Through a Punched or Cut Stencil In this marking methodology a stencil is cut or punched from a material selected for its non-stick properties relative to the chemical used as the marking medium. The process requires the stencil to be temporarily secured against the part to be marked and for the selected marking chemical to be sprayed, rolled, or otherwise applied over the stencil. When the stencil is removed—after the marking chemical has bonded—a three-dimensional data symbology is left on the surface.

This process is primarily limited by the bonding properties of the marking chemical and the conditions to which the marked part is to be subjected.

Alternatively, the stencil may be made of a non-release material. That is, the stencil material may be used for other purposes such as coating or contrast (for bar code readers). If the stencil is to be removed the date cell wall sides may be sloped to achieve a data cell base larger at the bottom in relationship to the top so as to promote easy removal. Conversely, if the stencil is to remain in the mold medium, the slope of the data cell bars may be reversed to aid in the locking of the stencil in place.

Non-Intrusive Application of a High Contrast Routed Stencil to Surfaces Under Existing Military Spec Application Processes In this process a flexible material is chosen for its longevity-under-harsh-conditions properties. The material will be homogenous but bi-layered; each layer's color chosen to appropriately contrast with the other. The selected data symbologies are routed through the top layer into a portion of the bottom layer leaving a highly contrasted, easily readable recessed, or protruding code. Whether the symbology is recessed or protruding depends on whether the code itself is routed, or whether the surrounding area is routed and removed. After the stencil is routed, it is applied according to existing military specifications for harsh environment application for polyurethane, or polyurethane-type, materials. In some instances, the bottom layer (i.e., the side applied to the part) may have a border which is perforated so that a thermal spray can be used to coat and embed the border thereby achieving a double-bond (chemical and mechanical) adhesion.

The bonding process and the conditions to which the marked part is to be subjected while in use will define the specific application regiment.

Non-Intrusive Point-of-Cast Stencil Insert For Casting Metal Parts in Investment Casting Punching or routing a pattern of the data symbol out of wax materials will achieve cast metal marking of data symbologies. The punched wax stencils are then applied to the wax mold with an adhesive or through a heat bonding process ('hot knife' for example). The application of the punched or cut wax mold completes the wax mold for dip. After the mold is dipped into whatever slurry the investment caster selects and the mold material hardens, and the wax is melted from the mold, the selected data symbology is part of the mold.

The stencil insert may be either placed in a recessed cavity in the wax mold, or not. Methodologies for securing the stencil insert to avoid backcasting will vary depending on the type of metal, the physical location at which the data symbol is desired, and pouring requirements.

The minimum size of the stencil insert is primarily limited by the properties of the metals to be cast and the machining or manufacturing processes to which the casting is subject. However, once the properties of the metals are known, the stencil insert process can be adjusted to achieve the preferred profiles for reading any data symbology.

Non-Intrusive Point-of-Cast Stencil Branding For Casting Metal Parts in Investment Casting Punching or routing a pattern of a selected data symbol out of plastic or plastic-type materials will achieve cast metal marking of data symbologies. The plastic or plastic-type materials are punched or routed, depending on the type of presentation required, so that either the data symbology or a reverse image of the data symbology results. The resulting data symbology stencil is then pressed into the wax mold so that the data symbology or its reverse image is 'branded' into the wax mold. The branding of the wax mold completes the wax mold for dip. After the mold is dipped into whatever slurry the investment caster selects and the mold material hardens, and the wax is melted from the mold, the selected data symbology is part of the mold, and becomes part of the casting when the molten metal is poured into the mold, and the mold is destroyed.

The branding stencil may be either pressed into a recessed cavity in the wax mold, or not.

The minimum size of the branding stencil is primarily limited by the properties of the metals to be cast and the machining or manufacturing processes to which the casting is subject. However, once the properties of the metals are known, the formation of the branding stencil process can be adjusted to achieve the preferred profiles for reading any data symbology.

Non-Intrusive Point-of-Cast Stencil Insert or Branding for Casting Metal Parts in Lost-Foam Casting Punching or routing a pattern of the data symbol out of foam or materials compatible with casting foams will achieve cast metal marking of data symbologies. Similar to investment casting, either a stencil will be attached onto the foam surface so that the data symbology will be formed as the foam is melted or dissolved, or a stencil will brand the foam surface to achieve the same result. Like investment casting, the data mark is achieved when the molten metal is poured into the cavity created by the disposal of the 'lost foam.'

Chemical Doping of Casting or Molding Stencil Material

In all of the processes where casting stencils are routed, punched, or cut into any stencil material, the stencil material may be chemically altered or doped so that the part material coming into contact with the stencil material will be semi-permanently or permanently stained a contrasting color or texture from the areas of the part material not in direct contact with the stencil. Part material will be metals, plastics, i.e., anything made in a casting or molding process. In the case of branding stencils in investment and lost foam casting, the chemical doping causing the staining or contrast may be transferred to the mold as the wax or foam is dissolved.

Texturing of Stencil Material

In all of the processes where casting stencils are used in any ferrous or non-ferrous metallic casting or molding process the stencil material may be roughened or textured on the side coming into contact with the cast surface so that a contrast texture shall be placed into the part material coming into contact with the roughened or textured stencil surface. The result of said roughening or texturing will cause a contrast in the data symbology surface and thus an easier 'read' by certain scanning or reading devices or technologies will result.

Bonding of Stencil Material to Cast Surface

In all the processes where casting stencils are used in any ferrous or non-ferrous metallic casting process the stencil may be chemically altered or enhanced to catalyze a bonding process of the stencil material during the casting. The result of the bonding process will be to hold the post-cast stencil in place for a period of time, thus bringing about a contrast with the part of the cast surface not coming into contact with the stencil material, all of which will result in easier reading by scanning or reading devices and technologies.

Use of Outgassing to Achieve A Mottled Cast Surface

In all the processes where casting stencils are used in any ferrous or non-ferrous metallic casting process the stencil may be chemically altered or enhanced to catalyze an outgassing reaction to the surface of the casting coming into contact with the stencil material. The result of the outgassing process will be to leave the surface of the casting coming into contact with the stencil material with a mottled surface (the result of gas bubbling during the pour and set up of the molten metal) thus bringing about a contrast with the part of the cast surface not coming into contact with the stencil material, all of which will result in easier reading by scanning or reading devices and technologies.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

What is claimed is:

1. A method for uniquely identifying a plurality of cast articles using a machine readable bar code number integrally cast into said articles during a casting process, said method comprising the steps of:

providing a plurality of bar code identification stencils each having a carrier strip which carries an identification code, each said identification code being formed of a plurality of spaced apart voids and being unique for each of said plurality of articles to be identified;

attaching said stencil to an interior surface of a casting mold cavity used to cast said articles;

filling said cavity with casting material to cast said articles and to fill said voids to thereby form said bar code number; and using each said stencil for each of said plurality of articles to be cast.

2. The method of claim 1, wherein said carrier strip includes an attachment element for attaching said identification stencil to said interior surface of said cavity.

3. The method of claim 2, wherein said carrier strip is adapted to be attached to said interior surface of said cavity using an attachment material.

4. The method of claim 3, wherein said carrier strip further includes a barrier layer for preventing said attachment material from coming into contact with said carrier strip.

5. The method of claim 1, wherein each of said voids are formed by a depression in said carrier strip.

6. The method of claim 1, wherein each of said voids is formed by a cutout in said carrier strip.

7. The method of claim 6, wherein each of said cutouts extends fully through said carrier strip.

8. The method of claim 1, wherein said carrier strip is generally flexible in order to conform to the shape of the interior surface of said cavity to which said stencil is attached.

9. The method of claim 1, wherein said carrier strip is made from mineral fiber.

10. The method of claim 1, wherein said carrier strip is made from wood pulp.

11. The method of claim 1, wherein said carrier strip is made from mica.

12. The method of claim 1, wherein said carrier strip is made from a material which can withstand a temperature of at least 3,000 degrees F. without being damaged to the point that said identification stencil is no longer useful for its intended purpose.

13. The method of claim 1, wherein said carrier strip is made from a material which can withstand a pressure of at least 1500 PSI without being damaged to the point that said identification stencil is no longer useful for its intended purpose.

14. The method of claim 1, wherein said identification code is formed of a plurality of identification code elements and wherein said carrier strip includes a plurality of identification code element locations, said voids being formed at selected ones of said element locations.

15. The method of claim 14, wherein the presence or absence of a said void at a said element location forms a unique identification code for said identification stencil.

16. The method of claim 1, wherein said carrier strip further includes an attachment element for attaching said identification stencil to said interior surface of said cast.

17. The method of claim 1, wherein said carrier strip is adapted to be attached to said interior surface of said cavity using an attachment material.

18. The method of claim 17, wherein said carrier strip further includes a barrier layer for preventing said attachment material from coming into contact with said carrier strip.

19. A method for uniquely identifying a plurality of molded articles using a machine readable bar code number integrally molded into said articles during a molding process, said method comprising the steps of:

providing a plurality of bar code identification stencils each having a carrier strip which carries an identification code, each said identification code being formed of a plurality of spaced apart voids and being unique for each of said plurality of articles to be identified;

attaching said stencil to an interior surface of a mold used to mold said articles;

filling said mold with molding material to mold said articles and to fill said voids to thereby form said bar code number; and using each said stencil for each of said plurality of articles to be molded.

20. The method of claim 19, wherein each of said voids extends through said carrier strip.

21. The method of claim 19, wherein each of said voids are formed by a depression in said carrier strip.

22. The method of claim 19, wherein each of said voids is formed by a cutout in said carrier strip.

23. The method of claim 22, wherein each of said cutouts extends fully through said carrier strip.

24. The method of claim 19, wherein said carrier strip is generally flexible in order to conform to the shape of the interior surface of said cast to which said stencil is attached.

25. The method of claim 19, wherein said carrier strip is made from mineral fiber.

26. The method of claim 19, wherein said carrier strip is made from wood pulp.

27. The method of claim 19, wherein said carrier strip is made from mica.

28. The method of claim 19, wherein said carrier strip is made from a material which can withstand a temperature of at least 3,000 degrees F. without being damaged to the point that said identification stencil is no longer useful for its intended purpose.

29. The method of claim 19, wherein said carrier strip is made from a material which can withstand a pressure of at least 1500 PSI without being damaged to the point that said identification stencil is no longer useful for its intended purpose.

30. The method of claim 19, wherein said identification code is formed of a plurality of identification code elements and wherein said carrier strip includes a plurality of identification code element locations, said voids being formed at selected ones of said element locations.

31. The method of claim 30, wherein the presence or absence of a said void at a said element location forms a unique identification code for said identification stencil.

32. The method of claim 19, wherein said carrier strip further includes an attachment element for attaching said identification stencil to said interior surface of said cast.

33. The method of claim 19, wherein said carrier strip is adapted to be attached to said interior surface of said cast using an attachment material.

34. The method of claim 33, wherein said carrier strip further includes a barrier layer for preventing said attachment material from coming into contact with said carrier strip.

35. A method for uniquely identifying a plurality of articles using a machine readable bar code number, said method comprising the steps of:

providing a plurality of bar code identification stencils each having a carrier strip which carries an identification code, each said identification code being formed of a plurality of spaced apart voids and being unique for each of said plurality of articles to be identified;

attaching said stencil to a plurality of said articles;

filling said voids to thereby form said bar code number; and using each said stencil for each of said plurality of articles to be identified.

36. The method of claim 35, wherein each of said voids extends through said carrier strip.

37. The method of claim 35, wherein each of said voids are formed by a depression in said carrier strip.

38. The method of claim 35, wherein each of said voids is formed by a cutout in said carrier strip.

39. The method of claim 38, wherein each of said cutouts extends fully through said carrier strip.

40. The method of claim 35, wherein said carrier strip is generally flexible in order to conform to the shape of the interior surface of said cast to which said stencil is attached.

41. The method of claim 35, wherein said carrier strip is made from mineral fiber.

42. The method of claim 35, wherein said carrier strip is made from wood pulp.

43. The method of claim 35, wherein said carrier strip is made from mica.

44. The method of claim 35, wherein said carrier strip is made from a material which can withstand a temperature of at least 3,000 degrees F. without being damaged to the point that said identification stencil is no longer useful for its intended purpose.

45. The method of claim 35, wherein said carrier strip is made from a material which can withstand a pressure of at least 1500 PSI without being damaged to the point that said identification stencil is no longer useful for its intended purpose.

46. The method of claim 35, wherein said identification code is formed of a plurality of identification code elements and wherein said carrier strip includes a plurality of identification code element locations, said voids being formed at selected ones of said element locations.

47. The method of claim 46, wherein the presence or absence of a said void at a said element location forms a unique identification code for said identification stencil.

48. The method of claim 35, wherein said carrier strip further includes an attachment element for attaching said identification stencil to said articles.

49. The method of claim 35, wherein each of said voids are filled by spraying a heated metal into said voids.

50. The method of claim 35, wherein each of said voids are filled by spraying paint into said voids.

51. The method of claim 35, wherein each of said voids are filled by spraying rubber into said voids.

52. The method of claim 35, wherein each of said voids are filled by spraying a material into said voids.

* * * * *